United States Patent
Kwon et al.

(10) Patent No.: US 11,437,023 B2
(45) Date of Patent: Sep. 6, 2022

(54) APPARATUS AND METHOD WITH SPEECH RECOGNITION AND LEARNING

(71) Applicant: Samsung Electronics Co., Ltd., Suwon-si (KR)

(72) Inventors: Ki Soo Kwon, Seoul (KR); Jeong-Hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 16/736,895

(22) Filed: Jan. 8, 2020

(65) Prior Publication Data

US 2021/0020167 A1    Jan. 21, 2021

(30) Foreign Application Priority Data

Jul. 19, 2019    (KR) .................. 10-2019-0087626

(51) Int. Cl.
| | |
|---|---|
| *G10L 15/16* | (2006.01) |
| *G10L 15/22* | (2006.01) |
| *G06N 3/063* | (2006.01) |
| *G10L 15/06* | (2013.01) |
| *G06N 3/08* | (2006.01) |
| *G10L 15/14* | (2006.01) |

(52) U.S. Cl.
CPC .............. *G10L 15/16* (2013.01); *G06N 3/063* (2013.01); *G06N 3/08* (2013.01); *G10L 15/063* (2013.01); *G10L 15/14* (2013.01); *G10L 15/22* (2013.01)

(58) Field of Classification Search
CPC ....... G10L 15/16; G10L 15/063; G10L 15/14; G10L 15/22; G06N 3/063; G06N 3/08
See application file for complete search history.

(56) References Cited

U.S. PATENT DOCUMENTS

| | | | |
|---|---|---|---|
| 10,242,665 B1* | 3/2019 | Abeloe | ............... G05D 1/0221 |
| 10,573,312 B1* | 2/2020 | Thomson | ................ G10L 15/26 |
| 2017/0091763 A1 | 3/2017 | Beadle et al. | |
| 2017/0127016 A1 | 5/2017 | Yu et al. | |

(Continued)

FOREIGN PATENT DOCUMENTS

| | | |
|---|---|---|
| KR | 10-2014-0076145 A | 6/2014 |
| KR | 10-2017-0046751 A | 5/2017 |

(Continued)

OTHER PUBLICATIONS

Dynamic Layer Normalization for Adaptive Neural Acoustic Modeling in Speech Recognition (Year: 2017).*

(Continued)

*Primary Examiner* — Mohammad K Islam
(74) *Attorney, Agent, or Firm* — NSIP Law

(57) ABSTRACT

A processor-implemented speech recognition method includes: applying, to an input layer of a neural network, a frame of a speech sequence; obtaining an output of a hidden layer of the neural network corresponding to the frame; calculating a statistical value of at least one previous output of the hidden layer corresponding to at least one previous frame of the speech sequence; normalizing the output based on the statistical value; applying the normalized output to a subsequent layer of the neural network; and recognizing the speech sequence based on the applying of the normalized output.

21 Claims, 6 Drawing Sheets

(56) References Cited

U.S. PATENT DOCUMENTS

| | | | |
|---|---|---|---|
| 2018/0061395 A1* | 3/2018 | Ding | G06N 3/08 |
| 2018/0071389 A1 | 3/2018 | Jones et al. | |
| 2018/0081089 A1 | 3/2018 | Kim et al. | |
| 2018/0137857 A1* | 5/2018 | Zhou | G10L 15/32 |
| 2018/0190268 A1* | 7/2018 | Lee | G10L 15/16 |
| 2018/0204371 A1 | 7/2018 | Kim et al. | |
| 2019/0266998 A1* | 8/2019 | Liang | G06F 17/18 |
| 2020/0074986 A1 | 3/2020 | Kwon | |
| 2020/0126534 A1* | 4/2020 | Yoo | G10L 15/16 |
| 2020/0160123 A1* | 5/2020 | Dennison | G06N 3/0481 |
| 2020/0193297 A1* | 6/2020 | Verhoef | G06F 17/18 |
| 2020/0234044 A1* | 7/2020 | Cai | G06T 5/001 |
| 2020/0242445 A1* | 7/2020 | de Vangel | G06N 3/063 |
| 2020/0342287 A1* | 10/2020 | Xu | G06N 3/08 |
| 2020/0357392 A1* | 11/2020 | Zhou | G10L 15/16 |
| 2021/0074264 A1* | 3/2021 | Liang | G06N 20/00 |

FOREIGN PATENT DOCUMENTS

| | | |
|---|---|---|
| KR | 10-2017-0060108 A | 5/2017 |
| KR | 10-1749254 B1 | 6/2017 |

OTHER PUBLICATIONS

Layer Normalization (Year: 2016).*
Loh, Woong-Kee et al., "An Efficient Algorithm for Streaming Time-Series Matching that Supports Normalization Transform", *Journal of KIISE: Databases*, pp. 600-619 (20 pages in Korean).
Jo Won Ho, "Neural Network (rnn) cycle [ml]," Happy Life Blog (Dec. 23, 2018), https://horajjan.blog.me/221425627229.

* cited by examiner

FIG. 5
Training Phase
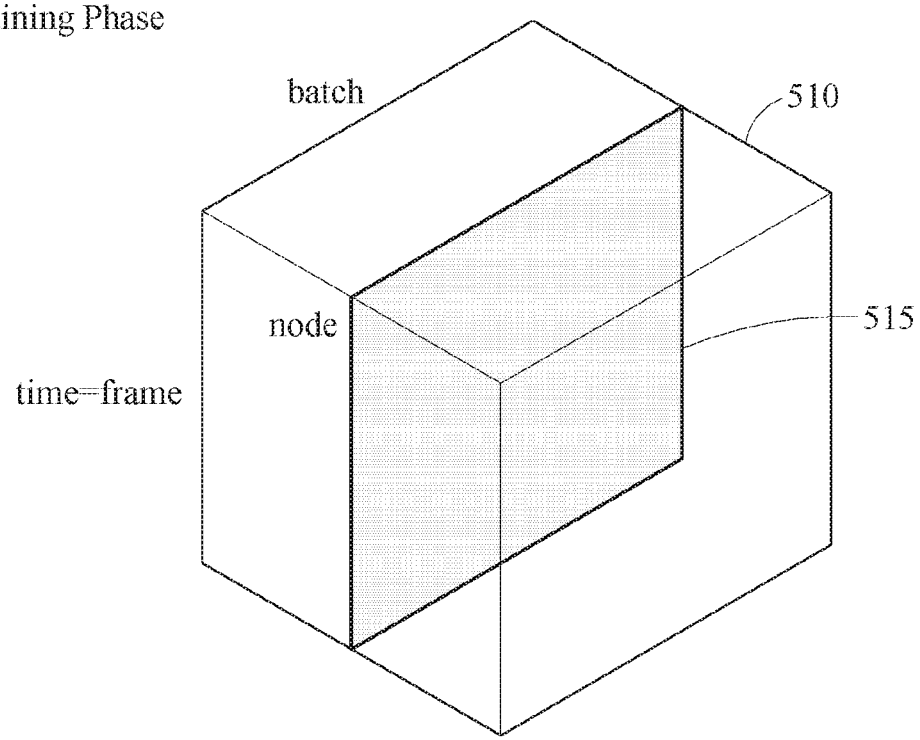
Test Phase
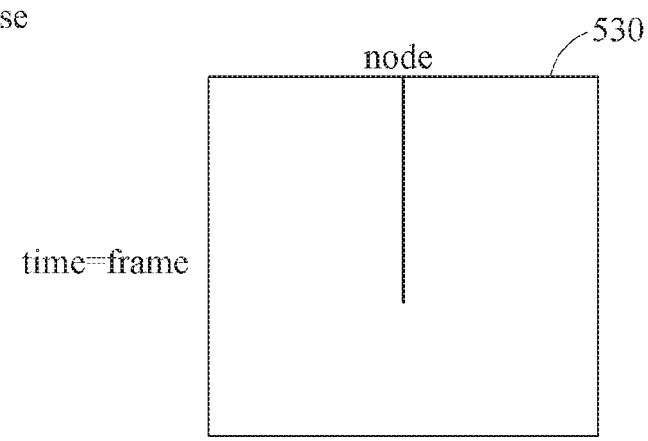

APPARATUS AND METHOD WITH SPEECH RECOGNITION AND LEARNING

This application claims the benefit under 35 USC § 119(a) of Korean Patent Application No. 10-2019-0087626 filed on Jul. 19, 2019, in the Korean Intellectual Property Office, the entire disclosure of which is incorporated herein by reference for all purposes.

BACKGROUND

1. Field

The following description relates to an apparatus and method with speech recognition and learning.

2. Description of Related Art

Batch normalization may be performed by obtaining statistical information (for example, average and variance) for an entire batch of data. Typical batch normalization may be performed using image data, but may not be performed using time-series data such as speech or sound signals that are input in a streaming form, as portions of the time-series data may be highly associated with each other based on a lapse of time. Although typical batch-unit processing may be enabled in a learning or training process, it may not be enabled in an actual recognition process, and thus a result of the learning or training process may not be matched, learned, or trained to a speech or voice to be recognized. In addition, to individualize a typical speech recognition method or apparatus to a particular user, a great amount of training data may be needed at once to train the typical speech recognition method or apparatus, and an entirety or a portion of a network of the typical speech recognition method or apparatus may need to be trained or learned, which may add inconvenience and take a great amount of time. Further, the typical speech recognition method or apparatus may not determine an appropriate update period in a process of individualizing speech recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented speech recognition method includes: applying, to an input layer of a neural network, a frame of a speech sequence; obtaining an output of a hidden layer of the neural network corresponding to the frame; calculating a statistical value of at least one previous output of the hidden layer corresponding to at least one previous frame of the speech sequence; normalizing the output based on the statistical value; applying the normalized output to a subsequent layer of the neural network; and recognizing the speech sequence based on the applying of the normalized output.

The statistical value of the at least one previous output may include either one or both of an average and a variance of the at least one previous output.

The at least one previous output may include a plurality of previous outputs of the hidden layer corresponding to respective previous frames of the speech sequence.

The normalizing of the output may include: setting the statistical value of the at least one previous output to be an initial statistical value; and normalizing the output by applying the output to the initial statistical value.

The applying of the output to the initial statistical value may include determining a ratio of a difference between the output and the initial statistical value to an approximated variance of the at least one previous output.

The normalizing of the output may include: retrieving, from a database, an initial statistical value of a user corresponding to the speech sequence; and normalizing the output by applying the output to the retrieved initial statistical value.

The normalizing of the output may include: updating the statistical value of the at least one previous output by applying the output to the statistical value of the at least one previous output; and normalizing the output using the updated statistical value of the previous at least one output.

A non-transitory computer-readable storage medium may store instructions that, when executed by one or more processors, configure the one or more processors to perform the method.

In another general aspect, a processor-implemented learning method includes: for each of speech sequences included in learning data, applying a frame of the speech sequence to an input layer of a neural network; obtaining an output of a hidden layer of the neural network corresponding to the frame; calculating a statistical value of at least one previous output of the hidden layer corresponding to at least one previous frame of the speech sequence; normalizing the output based on the statistical value; estimating a recognition result of the speech sequence by applying the normalized output to a subsequent layer of the neural network; and learning the neural network based on the estimated recognition result.

The calculating of the statistical value of the at least one previous output may include: calculating, as the statistical value, an initial statistical value for a batch of the learning data based on statistical values of speech sequences included in a previous batch of the learning data.

The normalizing of the output may include: updating the statistical value of the at least one previous output by applying the output to the statistical value of the at least one previous output; and normalizing the output using the updated statistical value of the at least one previous output.

The learning data may include a plurality of batches, wherein each of the batches may include a plurality of speech sequences of the speech sequences.

The statistical value of the at least one previous output may include either one or both of an average and a variance of the at least one previous output.

The method may further include: decomposing the speech sequences by a sequence unit.

In another general aspect, a speech recognition apparatus includes: a communication interface configured to receive a speech sequence; and one or more processors configured to: apply a frame of the speech sequence to an input layer of a neural network; obtain an output of a hidden layer of the neural network corresponding to the frame; calculate a statistical value of at least one previous output of the hidden layer corresponding to at least one previous frame of the speech sequence; normalize the output based on the statistical value and apply the normalized output to a subsequent layer of the neural network; and recognize the speech sequence based on the applying of the normalized output.

The statistical value of the at least one previous output may include either one or both of an average or a variance of the at least one previous output.

For the normalizing of the output, the one or more processors may be configured to: set the statistical value of the at least one previous output to be an initial statistical value; and normalize the output by applying the output to the initial statistical value.

For the normalizing of the output, the one or more processors may be configured to: retrieve, from a database, an initial statistical value of a user corresponding to the speech sequence; and normalize the output by applying the output to the retrieved initial statistical value.

For the normalizing of the output, the one or more processors may be configured to: update the statistical value of the at least one previous output by applying the output to the statistical value of the at least one previous output; and normalize the output using the updated statistical value of the at least one previous output.

The apparatus may be any one of a smartphone, a smart speaker, and an autonomous vehicle, and the communication interface may include a microphone.

In another general aspect, a learning apparatus includes: one or more processors configured to: for each of speech sequences included in learning data, apply a frame in the speech sequence to an input layer of a neural network; obtain an output of a hidden layer of the neural network corresponding to the frame; calculate a statistical value of at least one previous output of the hidden layer corresponding to at least one previous frame of the speech sequence; normalize the output based on the statistical value; estimate a recognition result of the speech sequence by applying the normalized output to a subsequent layer of the neural network; and learn the neural network based on the estimated recognition result.

For the calculating of the statistical value, the one or more processors may be configured to: calculate, as the statistical value, an initial statistical value for a batch of the learning data based on statistical values of speech sequences included in a previous batch of the learning data.

For the normalizing of the output, the one or more processors may be configured to: update the statistical value of the at least one previous output by applying the output to the statistical value of the at least one previous output; and normalize the output using the updated statistical value of the at least one previous output.

In another general aspect, a processor-implemented speech recognition method includes: obtaining an output of a neural network hidden layer based on a frame of a speech sequence input to a neural network input layer; normalizing the output based on either one or both of an average and a variance of previous outputs of the hidden layer generated based on previous frames of the speech sequence; inputting the normalized output to a subsequent hidden layer of the neural network; and recognizing the speech sequence based on an output of the subsequent hidden layer.

Other features and aspects will be apparent from the following detailed description, the drawings, and the claims.

BRIEF DESCRIPTION OF THE DRAWINGS

FIG. 5 is a diagram illustrating an example of normalizing a current output in each of a recognition process and a learning process.

Figure 1:
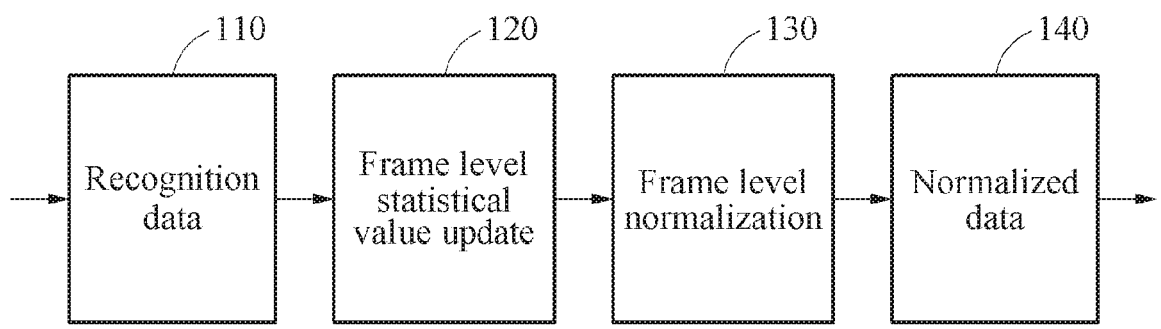
FIG. 1 is a diagram illustrating an example of a speech recognition process.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing various examples only and is not to be limiting of the examples. The articles "a," "an," and "the" are intended to include the plural forms as well, unless the context clearly indicates otherwise. It will be further understood that the terms "comprises/comprising" and/or "includes/including," when used herein, specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of a speech recognition process. Referring to FIG. 1, in operation 110, a speech recognition apparatus may receive recognition data. The recognition data used herein may be speech data to be recognized by the speech recognition apparatus. The recognition data may be, for example, user utterance data obtained by at least one microphone of a telephone, a mobile phone, a smart speaker, an autonomous vehicle, a robot, a smart vehicle, an audio recording device, and/or other similar audio devices. The recognition data may be a speech sequence including a single sentence (for example, "I wake up early in the morning and go to work") or a speech sequence including a plurality of sentences. For example, when a speech sequence includes a single sentence (for example, "I wake up early in the morning and go to work"), the speech sequence may include a plurality of speech frames (for example, "I," "wake up," "early," "in the morning," and "go to work"). Hereinafter, such speech frame will be referred to as a "frame" for convenience of description.

In an example, the speech recognition apparatus may be a user device (for example, a smartphone, a smart speaker, and/or an autonomous vehicle) or a server.

In operation 120, the speech recognition apparatus may update a statistical value (e.g., an average or a variance of outputs of a layer of a neural network) at a frame level of the recognition data. The updating of a statistical value at a frame level may be construed as updating a statistical value each time each frame generated by an utterance of a user is input, in sequential order, to the speech recognition apparatus based on a lapse of time. The speech recognition apparatus may update a statistical value through a moving average, each time each frame (for example, "I," "wake up," "early," "in the morning," and "go to work") is input in sequential order. Here, an initial value of the statistical value, or an initial statistical value, may be a value obtained in a learning process and prestored in association with a user in a database (DB) and the like.

In operation 130, the speech recognition apparatus may perform frame level normalization using the updated statistical value each time each frame is input. The speech recognition apparatus may perform normalization at a frame level each time each frame is input, as in the updating of a statistical value in operation 120. The frame level normalization may be construed as performing normalization each time a statistical value, which is updated each time each frame is input, is applied. For example, when one speech sequence includes five frames, operation 120 of updating a statistical value and operation 130 of performing frame level normalization may be performed on each frame, that is, a total of five times corresponding to the number of the frames. Accordingly, in an example, operation 120 and operation 130 may be iteratively performed for each frame of a speech sequence received as recognition data in operation 110.

In operation 140, the speech recognition apparatus may output data normalized in operation 130.

Time-series or sequential data, such as a speech signal, may have highly associated same order values or frequency values, and a significant statistical characteristic. For example, time-series or sequential data such as a speech signal and an audio signal may be converted to two-dimensional (2D) time-frequency data through a fast Fourier transform (FFT) and the like. In this example, in frequency-axis data, same orders may indicate a same frequency band, and they may be highly associated in terms of a lapse of time. That is, such association may be indicated by the statistical characteristic.

In a speech recognition apparatus of one or more embodiments, input speech signals may be processed in real time through streaming. Thus, the speech recognition apparatus of one or more embodiments may process a statistical value (such as an average value) through a moving average. Using this, the speech recognition apparatus of one or more embodiments may perform normalization using an updated statistical value for each frame.

According to an example embodiment, when a user utters speech, a statistical value may be updated for a plurality of frames included in a speech sequence of the speech in sequential order, and normalization may be performed. Thus, the speech recognition apparatus of one or more embodiments may advantageously provide an adaptive recognition service that is suitable for each individual user based on a voice or speech of the user, and/or is applicable to a nearby environment of the user. In addition, the speech recognition apparatus of one or more embodiments may improve accuracy in speech recognition over a typical speech recognition apparatus, by updating the statistical value and performing normalization for the plurality of frames in the sequential order.

Figure 2:
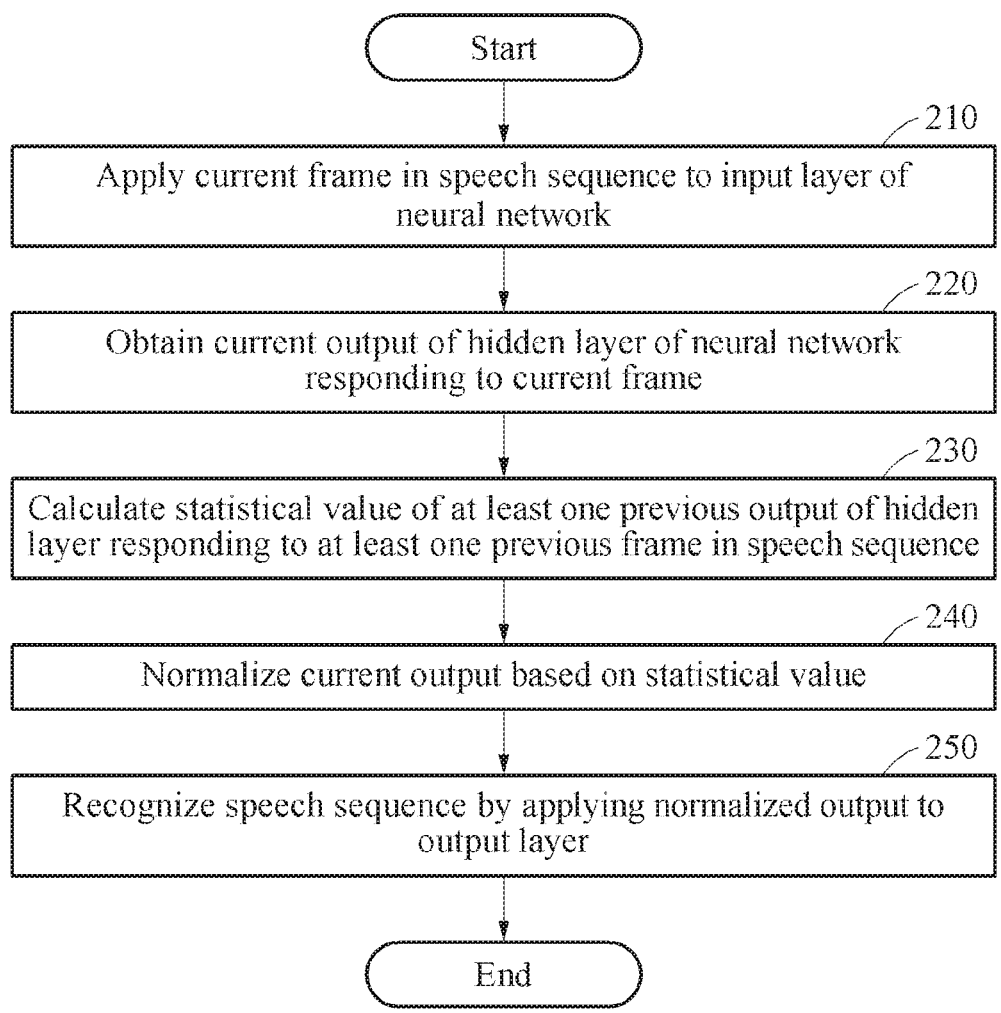
FIG. 2 is a flowchart illustrating an example of a speech recognition method.

FIG. 2 is a flowchart illustrating an example of a speech recognition method. Referring to FIG. 2, in operation 210, a speech recognition apparatus may apply a current frame in a speech sequence to an input layer of a neural network. The speech sequence may be received by at least one microphone of, for example, a telephone, a mobile terminal such as a smartphone, a smart speaker, a smart vehicle, a robot, an audio recording device, and/or other similar audio devices. The speech sequence may be a speech sequence including noise, or a speech sequence from which noise is removed by a signal processing apparatus. The speech sequence may correspond to a single sentence (for example, "I wake up early in the morning and go to work"). The speech sequence may include a plurality of frames (for example, "I," "wake up," "early," "in the morning," and "go to work") that are uttered by a user as time passes. The neural network may be, for example, a deep neural network (DNN) including an input layer, a hidden layer, and an output layer. The hidden layer may include a plurality of hidden layers.

In operation 220, the speech recognition apparatus may obtain a current output of a hidden layer of the neural network corresponding to the current frame (e.g., where the current output of the hidden layer may be generated as a result of the input of the current frame to the input layer).

In operation 230, the speech recognition apparatus may calculate a statistical value of at least one previous output of the hidden layer generated in response to at least one previous frame in the speech sequence. The statistical value of the previous output of the hidden layer may be represented as, for example, an average $$\mu^t = \frac{1}{m}\sum_{t=1}^{m} x^t$$

of previous outputs of the hidden layer and/or a variance $$\sigma_t^2 = \frac{1}{m}\sum_{t=1}^{m} (x^t - \mu^t)^2$$

of previous outputs out the hidden layer, in which $x^t$ denotes an input data value of a current frame t, and m denotes a magnitude of a batch, which is a natural number greater than or equal to 1.

A batch may refer to one of data processing types of a computer, and indicate processing data by arranging a certain period of time or a certain amount of time for data to be processed at once. A magnitude or size of a batch may be construed as being the number of samples before updating parameters of a neural network model. For example, when there are 400 sentences and 10 batches, there may be 40 sentences per batch, and thus there may be a total of 10 batches each including 40 sentences. In this example, a magnitude or a size of one batch may correspond to 40 sentences.

Through an L1-norm approximation, the variance may be approximated to $$\sigma_t = \frac{1}{m}\sum_{t=1}^{m} |x^t - \mu^t|.$$

The statistical value of the previous output may include at least one of, for example, an average $\mu^t$, a variance $\sigma_t^2$, or an approximated variance $\sigma_t$ of the previous output.

Using Equation 1 below, for example, the speech recognition apparatus may update the average of the previous output by applying the current output to the statistical value of the previous output (for example, $\mu^t$). Alternatively, the speech recognition apparatus may update the variance of the previous output as represented by Equation 2 below, for example.

$$\mu^{t+1} = \lambda\mu^t + (1-\lambda)x^t \quad \text{Equation 1}$$

$$\sigma^{t+1} = \lambda\sigma^t + (1-\lambda)(x^t - \mu^t)^2 \quad \text{Equation 2}$$

In the equations above, A denotes a smoothing factor, which is a real number having a value close to 1 (for example, 0.999).

The average of the previous output may also be represented by Equation 3, for example.

$$\mu^{t+1} = (1-\lambda)\mu^t + \lambda x^t = \mu^t + \lambda(x^t - \mu^t) \rightarrow \mu^{t+1} = \mu^0 + \lambda(\Sigma_{i=1}^{t+1} x^i - (t+1)\mu^0) - \lambda^2(\Sigma_{i=1}^{t}(t-i+1)x^i - \mu^0\Sigma_{i=1}^{t}) + \lambda^3( \ldots$$
$$\rightarrow \mu^{t+1} = \mu^0 + \lambda(\Sigma_{i=1}^{t+1} x^i - (t+1)\mu^0) \quad \text{Equation 3}$$

Although the statistical value $\mu^t$ of the previous output may not be known, the statistical value of the previous output that is updated based on an input value of a corresponding frame and an initial statistical value $\mu^0$ may be obtained.

In operation 240, the speech recognition apparatus may normalize the current output using the updated statistical value of the previous output. For example, the speech recognition apparatus may set the statistical value of the previous output to be an initial statistical value, and normalize the current output by applying the current output to the initial statistical value. The initial statistical value may be the statistical value $\mu^t$ of the previous output, or an initial statistical value $\mu^0$ of a user corresponding to the speech sequence. The initial statistical value $\mu^0$ of the user may be retrieved from a DB. The initial statistical value $\mu^0$ of the user may be stored in advance in the DB in association with identification information of the user (for example, a user identifier (ID)).

In operation 240, the speech recognition apparatus may normalize the current output based on the statistical value calculated in operation 230. For example, the speech recognition apparatus may use, as an initial value, a statistical value obtained from learning. Each time speech recognition is performed, the speech recognition apparatus may update a statistical value using an input speech signal value through a moving average, and simultaneously perform frame level normalization on each frame. The speech recognition apparatus may normalize the current output to be $$\hat{x}^t = \frac{x^t - \mu^0}{\sqrt{\sigma^t}}.$$

Hereinafter, how the speech recognition apparatus normalizes a current output will be described in detail with reference to FIG. 5, as a non-limiting example.

In operation 250, the speech recognition apparatus may recognize the speech sequence by applying the normalized output to a subsequent layer. The subsequent layer may be an output layer, or a subsequent hidden layer of the hidden layer. In an example, when the normalized output is applied to the subsequent hidden layer, operations 220 through 250 may be performed wherein the subsequent hidden layer is considered as the hidden layer.

Figure 3:
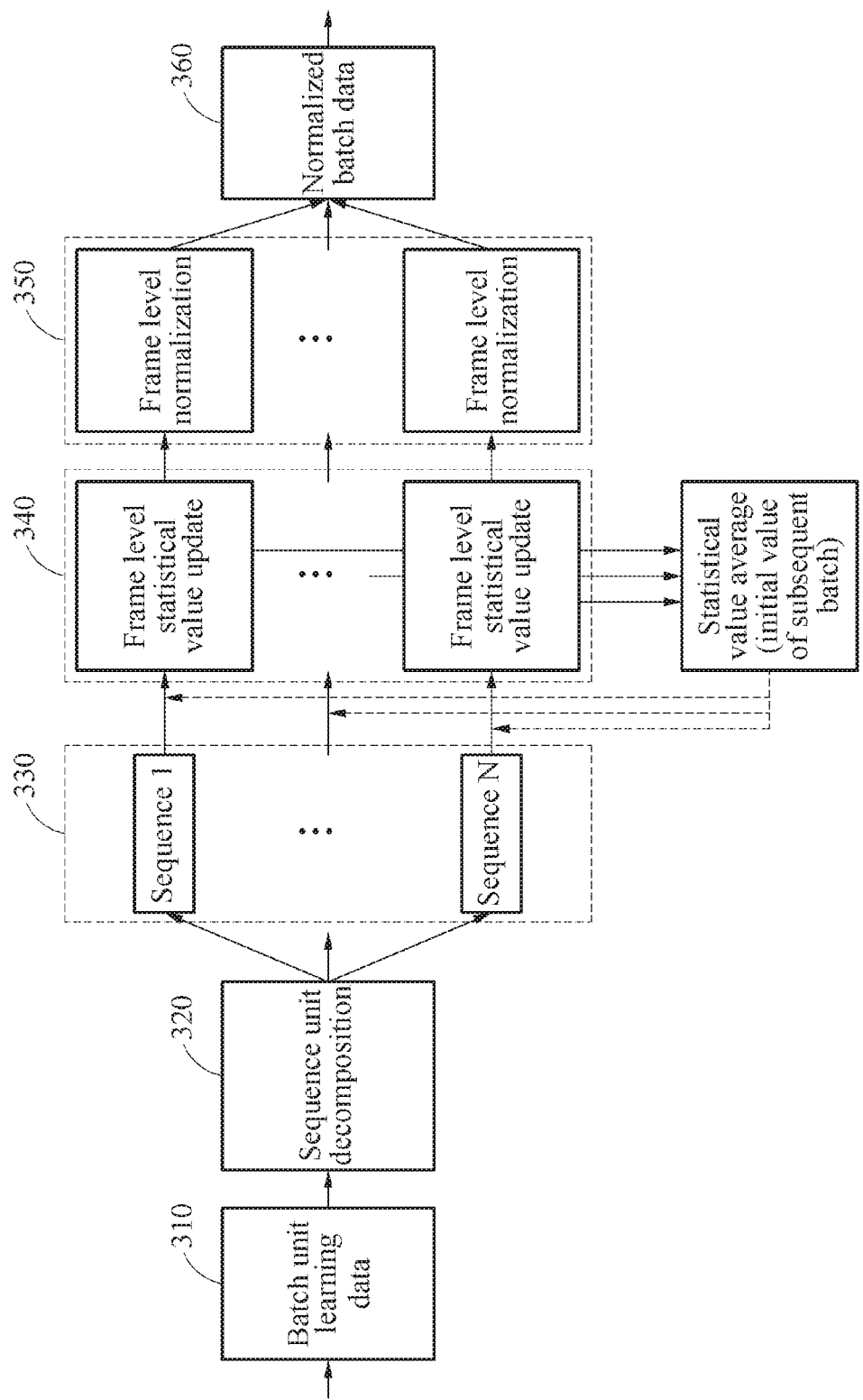
FIG. 3 is a diagram illustrating an example of a learning process for speech recognition.

FIG. 3 is a diagram illustrating an example of a learning process for speech recognition. An example of FIG. 3 illustrates how a learning apparatus may normalize learning data.

As described above, a speech signal or a sound signal may be time-series data greatly associated based on a lapse of time, and the speech recognition apparatus of one or more embodiments may readily track an average and a variance through a moving average, for example. The moving average may be a method of obtaining a trend line by connecting averages of a preset number of values prior to or subsequent to each value to be obtained in a time-series manner.

In an example, using a characteristic of the moving average described above, the speech recognition apparatus of one or more embodiments may perform normalization immediately by obtaining a statistical value at a frame level when performing a batch normalization in the learning processor for speech recognition. When such frame level normalization is performed by the speech recognition apparatus of one or more embodiments, the speech recognition apparatus of one or more embodiments may apply the same method to an actual speech recognition process, and thus a mismatch that may occur between the learning process and the recognition process is reduced compared to a typical speech recognition apparatus that does not perform such framel level normalization. In addition, using the characteristic of the moving average, the speech recognition apparatus of one or more embodiments may adapt to a voice or speech of a user, or a noise and reverberation in a nearby environment, in an actual recognition process, and is thus possible to adaptively recognize a speech of the user for each moment.

Referring to FIG. 3, in operation 310, a learning apparatus may receive learning data by a batch unit. A batch unit may include, for example, a plurality of speech sequences of 100, 200, or any number of sentences. The learning data may be stored in advance in a learning DB, for example.

In operation 320, the learning apparatus may decompose the learning data into each sequence unit. The learning data may include a plurality of speech sequences.

In operation 340, the learning apparatus may update a statistical value at a frame level, independently, for each of sequences 330 obtained through such sequence unit decomposition. The learning apparatus may update a statistical value of each sequence by a frame unit. For example, the learning apparatus may update an average value of each sequence as represented in Equation 1 above, and update a variance of each sequence as represented in Equation 2 above. The learning apparatus may use, as an initial statistical value, an average value and a variance value corresponding to a previous frame, and update the statistical value by, for example, $(1-\lambda)$, each time a frame moves one by one.

In operation 350, while a frame level statistical value is being updated for each sequence, the learning apparatus may simultaneously perform frame level normalization using the updated statistical value. The learning apparatus may normalize an input value of each frame using a previously obtained statistical value. Since a statistical value changes for each frame, a normalization result may change for each frame.

Each of sequences in a single batch may be tracked by performing a moving average on a statistical value. Thus, the number of statistical values corresponding to the number of the sequences may be generated, and these values may be averaged to a single statistical value. The single statistical value may be used as an initial statistical value of each set of sequence data of a subsequent batch. For example, the learning apparatus may update a statistical value for each frame of each sequence, and calculate an average of final statistical values for each sequence that are finally updated through a last frame of each sequence. The learning apparatus may then use the average to normalize a subsequent batch. In this example, the average of the final statistical values may be used as an initial statistical value for the subsequent batch.

In operation 360, the learning apparatus may output batch data that is finally normalized through the frame level normalization for each of the sequences.

The learning process described above may be performed by a DNN including a plurality of layers. For example, when the DNN includes four hidden layers, normalization may be performed four times.

For example, as an input $x^t$ is applied to the DNN, a batch normalization result $\hat{x}^t$ to be output from the DNN may be indicated as in Table 1 below.

TABLE 1

Input: Values: of x over a mini-batch: $\mathcal{B} = \{x_1 \ldots m\}$;
  Parameters to be learned: $\gamma$, $\beta$
Output: $\{y_t = BN_{\gamma,\beta}(x^t)\}$ $$\mu^t = \frac{1}{m}\sum_{t=1}^{m} x^t \ \text{// mini-batch mean}$$

$$\sigma_t^2 = \frac{1}{m}\sum_{t=1}^{m}(x^t - \mu^t)^2 \ \text{// mini-batch variance}$$

$$\hat{x}^t = \frac{x^t - \mu^t}{\sqrt{\sigma^t}} \ \text{// normalize}$$

In Table 1, $\gamma$, $\beta$ may be parameters to be learned in the learning process.

In an example, by smoothing and updating an average value and/or a standard deviation, which is a statistical value, to an output value of a current frame, normalization may be performed on the statistical value without m output values, for example. In addition, the normalization may be approximated only with the average value, without calculating or estimating the standard deviation.

Figure 4:
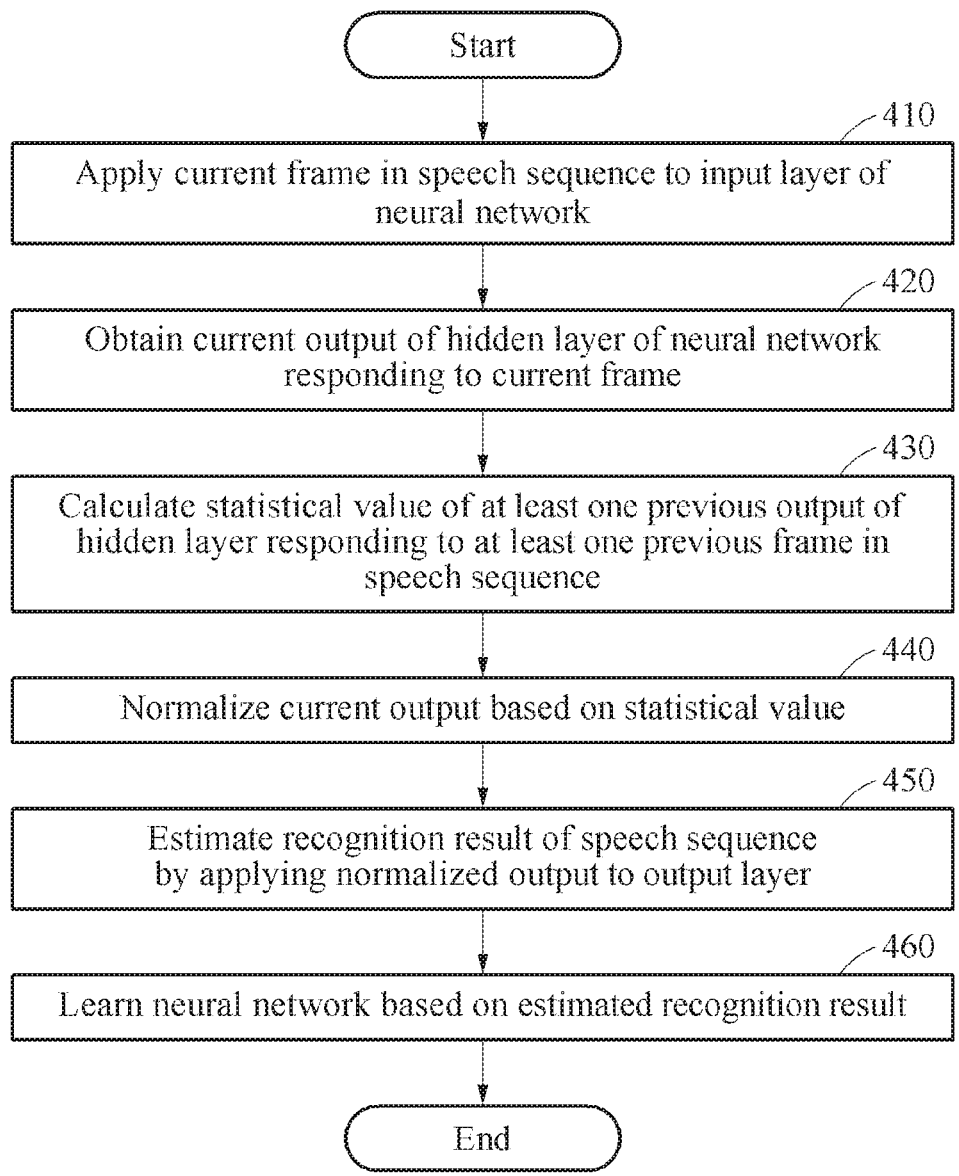
FIG. 4 is a flowchart illustrating an example of a learning method for speech recognition.

FIG. 4 is a flowchart illustrating an example of a learning method for speech recognition. A learning apparatus for speech recognition may perform operations 410 through 460 to be described hereinafter for each of a plurality of speech sequences included in learning data. Each of the operations to be described hereinafter may be construed as being performed for each of the speech sequences included in the learning data, although there is no expression indicating such. The learning apparatus may be a server, for example.

Referring to FIG. 4, in operation 410, the learning apparatus may apply, to an input layer of a neural network, a current frame in a speech sequence among a plurality of speech sequences included in learning data. The learning data may include a plurality of batches, and each of the batches may include a plurality of sentences.

In operation 420, the learning apparatus may obtain a current output of a hidden layer of the neural network corresponding to the current frame.

In operation 430, the learning apparatus may calculate a statistical value of at least one previous output of the hidden layer corresponding to at least one previous frame in the speech sequence. The learning apparatus may calculate an initial statistical value for a current batch of the learning data based on statistical values of speech sequences included in a previous batch of the learning data.

In operation 440, the learning apparatus may normalize the current output based on the statistical value.

For example, the learning apparatus may update the statistical value of the previous output by applying the current output to the statistical value of the previous output, and normalize the current output using the updated statistical value of the previous output. The statistical value of the previous output may include at least one of an average or a variance of the previous output. Hereinafter, how the learning apparatus normalizes a current output will be described in detail with reference to FIG. 5.

In operation 450, the learning apparatus may estimate a recognition result of the speech sequence by applying the normalized output to a subsequent layer of the hidden layer.

In operation 460, the learning apparatus may learn or train the neural network based on the estimated recognition result.

FIG. 5 is a diagram illustrating an example of normalizing a current output in each of a recognition process and a learning process. In an example of FIG. 5, illustrated is a method 510 of normalizing a current output in a learning or training process, and a method 530 of normalizing a current output in a recognition or test process.

In the method 510, an x axis indicates the number of nodes of a neural network included in a learning apparatus, and a y axis indicates time. That is, the y axis indicates a plurality of frames included in speech sequences to be input as a time passes. In addition, a z axis indicates a magnitude or size of a batch.

In the learning process, normalization may be performed on each of a plurality of speech sequences included in learning data. For example, a magnitude of a batch may correspond to 100 speech sequences, and the number of nodes may be 10 and a time may be 20 seconds.

In an example, the normalization described above with reference to FIGS. 3 and 4 may be performed on each of the 10 nodes independently. In an example, at each node of the neural network, the normalization may be performed on the 100 speech sequences corresponding to the magnitude of batch for 20 seconds as illustrated by reference numeral 515. In addition, at each node, the normalization may be performed in sequential order of frames included in each speech sequence, based on a lapse of time.

In the method 530, an x axis indicates the number of nodes of a neural network, and an y axis indicates a lapse of time. In actual speech recognition, a speech sequence may be input in real time by an utterance of a user as time elapses. The speech sequence may include a plurality of frames which are input to a speech recognition apparatus in sequential order one by one based on a lapse of time. Thus, the speech recognition apparatus may obtain a current output of a hidden layer of the neural network corresponding to a current frame of the speech sequence, and normalize the current frame based on a statistical value of at least one previous output of the hidden layer corresponding to at least one previous frame of the speech sequence.

Figure 6:
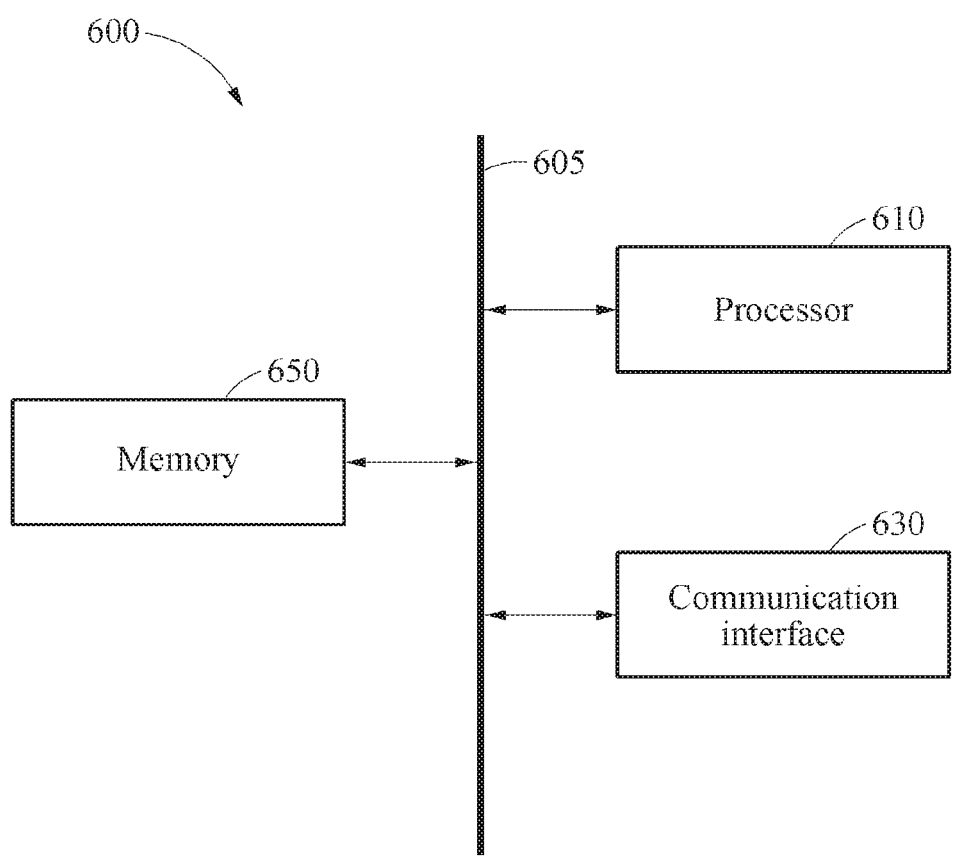
FIG. 6 is a diagram illustrating an example of an apparatus.

FIG. 6 is a diagram illustrating an example of an apparatus. Referring to FIG. 6, an apparatus 600 according to an example embodiment may include a processor 610 (e.g., one or more processors) and a communication interface 630. The apparatus 600 may further include a memory 650. The processor 610, the communication interface 630, and the memory 650 may communicate with one another through a communication bus 605. The apparatus 600 may be a speech recognition apparatus or a learning apparatus.

In an example, the apparatus 600 may be a speech recognition apparatus (e.g., such as any of the speech recognition apparatuses described above).

In an example, the processor 610 may apply, to an input layer of a neural network, a current frame of a speech sequence received through the communication interface 630, and obtain a current output of a hidden layer of the neural network corresponding to the current frame. The processor 610 may calculate a statistical value of at least one previous output of the hidden layer corresponding to at least one previous frame of the speech sequence, and normalize the current output based on the calculated statistical value. The processor 610 may recognize the speech sequence by applying the normalized output to a subsequent layer of the hidden layer.

In an example, the communication interface 630 may receive the current frame in the speech sequence.

In an example, the memory 650 may store, in sequential order, the speech sequence received through the communication interface 630. The memory 650 may store at least one of the current output of the hidden layer of the neural network, the statistical value of the previous output, a result of normalizing the current output, or a speech recognition result that is finally obtained through recognition by the processor 610.

In another example, the apparatus 600 may be a learning apparatus (e.g., such as any of the learning apparatuses described above).

In an example, for each of a plurality of speech sequences, the processor 610 may apply a current frame of a speech sequence to an input layer of a neural network. The processor 610 may obtain a current output of a hidden layer of the neural network corresponding to the current frame. The processor 610 may calculate a statistical value of at least one previous output of the hidden layer corresponding to at least one previous frame of the speech sequence, and normalize the current output based on the calculated statistical value. The processor 610 may apply the normalized output to a subsequent layer of the hidden layer and estimate a recognition result of the speech sequence. The processor 610 may learn or train the neural network based on the estimated recognition result.

In an example, the communication interface 630 may receive each of a plurality of speech sequences included in learning data.

In an example, the memory 650 may store the learning data.

In addition, the processor 610 may perform one or more operations or methods described above with reference to FIGS. 1 through 5, and algorithms corresponding to the operations or methods. The processor 610 may be a data processing apparatus embodied by hardware having a circuit of a physical structure to execute desired operations. The desired operations may include, for example, codes or instructions included in a program. The data processing apparatus embodied by hardware may include, for example, a microprocessor, a central processing unit (CPU), a processor core, a multi-core processor, a multiprocessor, an application-specific integrated circuit (ASIC), and a field-programmable gate array (FPGA).

The processor 610 may execute the program, and control the apparatus 600. A code of the program to be executed by the processor 610 may be stored in the memory 650.

The memory 650 may store various sets of information generated when the processor 610 performs the operations and methods described above. The memory 650 may also store other various sets of data and programs. The memory 650 may include a volatile memory or a nonvolatile memory. The memory 650 may include a mass storage medium, for example, a hard disk, to store the various sets of data.

The apparatuses, speech recognition apparatuses, learning apparatuses, processors, communication interfaces, memories, communication buses, apparatus 600, processor 610, communication interface 630, memory 650, communication bus 605, and other apparatuses, units, modules, devices, and other components described herein with respect to FIGS. 1-6 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented speech recognition method comprising:
   applying, to an input layer of a neural network, a frame of a speech sequence;
   obtaining an output of a hidden layer of the neural network corresponding to the frame;
   calculating a statistical value of at least one previous output of the hidden layer corresponding to at least one previous frame of the speech sequence;
   normalizing the output based on the statistical value, wherein the normalizing of the output comprises setting the statistical value of the at least one previous output to be an initial statistical value, and normalizing the output by applying the output to the initial statistical value, and wherein the normalizing of the output comprises determining a ratio of a difference between the output and the initial statistical value to an approximated variance of the at least one previous output;
   applying the normalized output to a subsequent layer of the neural network; and
   recognizing the speech sequence based on the applying of the normalized output.

2. The method of claim 1, wherein the statistical value of the at least one previous output includes either one or both of an average and a variance of the at least one previous output.

3. The method of claim 2, wherein the at least one previous output includes a plurality of previous outputs of the hidden layer corresponding to respective previous frames of the speech sequence.

4. The method of claim 1, wherein the normalizing of the output comprises:
   retrieving, from a database, an initial statistical value of a user corresponding to the speech sequence; and
   normalizing the output by applying the output to the retrieved initial statistical value.

5. The method of claim 1, wherein the normalizing of the output comprises:
   updating the statistical value of the at least one previous output by applying the output to the statistical value of the at least one previous output; and
   normalizing the output using the updated statistical value of the previous at least one output.

6. A non-transitory computer-readable storage medium storing instructions that, when executed by one or more processors, configure the one or more processors to perform the method of claim 1.

7. A processor-implemented learning method comprising:
   for each of speech sequences included in learning data, applying a frame of the speech sequence to an input layer of a neural network;
   obtaining an output of a hidden layer of the neural network corresponding to the frame;
   calculating a statistical value of at least one previous output of the hidden layer corresponding to at least one previous frame of the speech sequence;
   normalizing the output based on the statistical value, wherein the normalizing of the output comprises setting the statistical value of the at least one previous output to be an initial statistical value, and normalizing the output by applying the output to the initial statistical value, and wherein the normalizing of the output comprises determining a ratio of a difference between the output and the initial statistical value to an approximated variance of the at least one previous output;
   estimating a recognition result of the speech sequence by applying the normalized output to a subsequent layer of the neural network; and
   learning the neural network based on the estimated recognition result.

8. The method of claim 7, wherein the calculating of the statistical value of the at least one previous output comprises:
   calculating, as the statistical value, the initial statistical value for a batch of the learning data based on statistical values of speech sequences included in a previous batch of the learning data.

9. The method of claim 7, wherein the normalizing of the output comprises:
   updating the statistical value of the at least one previous output by applying the output to the statistical value of the at least one previous output; and
   normalizing the output using the updated statistical value of the at least one previous output.

10. The method of claim 7, wherein the learning data includes a plurality of batches, wherein each of the batches includes a plurality of speech sequences of the speech sequences.

11. The method of claim 7, wherein the statistical value of the at least one previous output includes either one or both of an average and a variance of the at least one previous output.

12. The method of claim 7, further comprising:
    decomposing the speech sequences by a sequence unit.

13. A speech recognition apparatus comprising:
    a communication interface configured to receive a speech sequence; and
    one or more processors configured to:
    apply a frame of the speech sequence to an input layer of a neural network;
    obtain an output of a hidden layer of the neural network corresponding to the frame;
    calculate a statistical value of at least one previous output of the hidden layer corresponding to at least one previous frame of the speech sequence;
    normalize the output based on the statistical value, wherein the normalizing of the output comprises setting the statistical value of the at least one previous output to be an initial statistical value, and normalizing the output by applying the output to the initial statistical value, and wherein the normalizing of the output comprises determining a ratio of a difference between the output and the initial statistical value to an approximated variance of the at least one previous output; and
    apply the normalized output to a subsequent layer of the neural network; and
    recognize the speech sequence based on the applying of the normalized output.

14. The apparatus of claim 13, wherein the statistical value of the at least one previous output includes either one or both of an average or a variance of the at least one previous output.

15. The apparatus of claim 13, wherein, for the normalizing of the output, the one or more processors are configured to:
retrieve, from a database, an initial statistical value of a user corresponding to the speech sequence; and
normalize the output by applying the output to the retrieved initial statistical value.

16. The apparatus of claim 13, wherein, for the normalizing of the output, the one or more processors are configured to:
update the statistical value of the at least one previous output by applying the output to the statistical value of the at least one previous output; and
normalize the output using the updated statistical value of the at least one previous output.

17. The apparatus of claim 13, wherein
the apparatus is any one of a smartphone, a smart speaker, and an autonomous vehicle, and
the communication interface includes a microphone.

18. A learning apparatus comprising:
one or more processors configured to:
for each of speech sequences included in learning data, apply a frame in the speech sequence to an input layer of a neural network;
obtain an output of a hidden layer of the neural network corresponding to the frame;
calculate a statistical value of at least one previous output of the hidden layer corresponding to at least one previous frame of the speech sequence;
normalize the output based on the statistical value, wherein the normalizing of the output comprises setting the statistical value of the at least one previous output to be an initial statistical value, and normalizing the output by applying the output to the initial statistical value, and wherein the normalizing of the output comprises determining a ratio of a difference between the output and the initial statistical value to an approximated variance of the at least one previous output;
estimate a recognition result of the speech sequence by applying the normalized output to a subsequent layer of the neural network; and
learn the neural network based on the estimated recognition result.

19. The apparatus of claim 18, wherein, for the calculating of the statistical value, the one or more processors are configured to:
calculate, as the statistical value, the initial statistical value for a batch of the learning data based on statistical values of speech sequences included in a previous batch of the learning data.

20. The apparatus of claim 18, wherein, for the normalizing of the output, the one or more processors are configured to:
update the statistical value of the at least one previous output by applying the output to the statistical value of the at least one previous output; and
normalize the output using the updated statistical value of the at least one previous output.

21. A processor-implemented speech recognition method comprising:
obtaining an output of a neural network hidden layer based on a frame of a speech sequence input to a neural network input layer;
normalizing the output based on either one or both of an average and a variance of previous outputs of the hidden layer generated based on previous frames of the speech sequence, wherein the normalizing of the output comprises setting either one of the average and the variance of at least one previous output, from among the previous outputs, to be an initial statistical value, and normalizing the output by applying the output to the initial statistical value, and wherein the normalizing of the output comprises determining a ratio of a difference between the output and the initial statistical value to either one of the average and the variance of the at least one previous output;
inputting the normalized output to a subsequent hidden layer of the neural network; and
recognizing the speech sequence based on an output of the subsequent hidden layer.

* * * * *